United States Patent
Lehtinen

(10) Patent No.: US 6,687,364 B1
(45) Date of Patent: Feb. 3, 2004

(54) SERVICE PROVISION IN A TELECOMMUNICATIONS NETWORK

(75) Inventor: Pekka Lehtinen, Järvenpää (FI)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 09/625,114

(22) Filed: Jul. 25, 2000

Related U.S. Application Data

(63) Continuation of application No. PCT/FI99/00077, filed on Feb. 3, 1999.

(30) Foreign Application Priority Data

Feb. 3, 1998 (FI) .................................................. 980240

(51) Int. Cl.⁷ .............................................. H04M 7/100
(52) U.S. Cl. .................................. 379/219; 379/221.08
(58) Field of Search ............................ 379/219, 220.01, 379/220.08–221.12, 229, 230; 370/552, 259

(56) References Cited

U.S. PATENT DOCUMENTS

| | | | |
|---|---|---|---|
| 5,386,464 A | 1/1995 | Pruitt | |
| 5,544,236 A | 8/1996 | Andruska et al. | |
| 5,574,782 A | 11/1996 | Baird et al. | |
| 5,790,789 A | 8/1998 | Suarez | |
| 5,974,252 A * | 10/1999 | Lin et al. | 395/701 |
| 6,314,172 B1 * | 11/2001 | Nightingale | 379/201 |
| 6,425,005 B1 * | 7/2002 | Dugan et al. | 709/223 |
| 6,487,288 B1 * | 11/2002 | Tuunanen | 379/230 |

FOREIGN PATENT DOCUMENTS

| | | |
|---|---|---|
| EP | 0569180 | 11/1993 |
| EP | 0 685 955 | 12/1995 |
| EP | 0 873 029 | 10/1998 |
| GB | 2301983 | 12/1996 |
| JP | 9055799 | 2/1997 |
| WO | WO 95/23483 | 8/1995 |
| WO | WO 95/34175 | 12/1995 |
| WO | 96/21310 | 7/1996 |
| WO | WO 96/42173 | 12/1996 |
| WO | WO 97/25849 | 7/1997 |
| WO | WO 97/36431 | 10/1997 |
| WO | 99/09659 | 2/1998 |
| WO | WO 98/32293 | 7/1998 |
| WO | 98/55919 | 12/1998 |

* cited by examiner

Primary Examiner—William J. Deane, Jr.
(74) Attorney, Agent, or Firm—Squire, Sanders & Dempsey L.L.P.

(57) ABSTRACT

The invention relates to a method for service provision in a telecommunications network, specifically in an intelligent network. In accordance with the method, service programs (SLP) are stored in at least one network element of the network and service is provided by starting a service program executing the desired service logic. In order that the service logic needed by the subscriber may be distinguished more clearly than heretofore from the remaining service logic and thereby new services may be implemented faster than heretofore, the service programs of the networks element are implemented in such a way that (a) a dedicated messaging block (TB) is formed for each individual message type to be sent from the service program to the network and sending of messages of different types to the network is implemented by means of the messaging blocks, and (b) after the messaging block and generic halt state block (HSB) is used in the service logic to receive a message arriving from the network each time the type of the message sent by the messaging block is such that a response message of a given type is received to it in the case of faultless operation.

15 Claims, 10 Drawing Sheets

SERVICE PROVISION IN A TELECOMMUNICATIONS NETWORK

This application is a continuation of application Ser. No. PCT/FI99/00077 filed Feb. 3, 1999.

FIELD OF THE INVENTION

The invention relates generally to implementation of services in a telecommunications network, particularly an intelligent network. The service may be any service produced in the network for a network user or another object.

BACKGROUND OF THE INVENTION

The rapid evolvement of the telecommunications field has afforded operators the capability of providing many different types of services to users. A network architecture that provides advanced services is called an intelligent network. The common abbreviation for intelligent network is IN.

The functional architecture of an intelligent network is shown in FIG. 1 where the functional entities of the network are shown as ovals. This architecture is described briefly below, because the invention will be described hereinafter with reference to the intelligent network environment.

The access of the end user (subscriber) to the network is handled by the CCAF (Call Control Agent Function). The access to the IN services is implemented by making additions to existing digital exchanges. This is done by using the basic call state model BCSM which describes the existing functionality used to process a call between two users. The BCSM is a high level state automaton description of the call control functions CCF required for establishing and maintaining a connection route between users. Functionality is added to this state model by using the service switching function SSF (cf. the partial overlap of the entities CCF and SSF is FIG. 1) so that it is possible to decide when it is necessary to call the services of the intelligent network (the IN services). After these IN services have been called, the service control function SCF that contains the service logic for the intelligent network handles the service-related processing (of the call attempt). The service switching function SSF thereby connects the call control function CCF to the service control function SCF and allows the service control function SCF to control the call control function CCF. For example, SCF can request that the SSF/CCF perform specific call or connection functions, for example charging or routing operations. The SCF can also send requests to the service data function SDF which handles the access to the service-related data and network data of the intelligent network. The SCF can thus for example request the SDF to retrieve specific service-related data or update this data.

The functions described above are further complemented by the specialized resources functions SRF which provides the special functions required for implementing some of the services provided by the intelligent network. Examples of these services are protocol conversions, speech recognition, voice mail, etc. The SCF can, for example, request the SSF/CCF functions to first establish a connection between the end users and SRF and then it can request the SRF to give voice announcements to the end users.

Other functional entities of the intelligent network are various functions that relate to control, such as the SCEF (Service Creation Environment Function), SMF (Service Management Function), and SMAF (Service Management Access Function). The SMF includes, among other things, service control, the SMAF provides the connection to the SMF, and the SCEF makes it possible to specify, develop, test and feed IN services via the SMF to the SCF. Because these functions only relate to the operation of the network operator, they are not shown in FIG. 1.

The role of the functional entities described in FIG. 1 as relating to the IN services will be briefly described below. The CCAF receives the service request given by the calling party. The service request usually consists of lifting the receiver and/or a series of digit dialed by the calling party. The CCAF further transmits the service request to the CCF/SSF for processing. The call control function CCF does not have the service data but it has been programmed to recognize the need of a service request. The CCF interrupts the call setup for a movement and notifies the service switching function SSF about the state of the call. The task of the SSF is, using predefined criteria, to interpret the service request and thus determine whether the request is a service request related to the IN services. If this is the case, the SSF composes a standardized IN service request and sends the request to the SCF along with information about the state of the service request. The SCF receives the request and decodes it. After that it cooperates with the SSF/CCF, SRF, and SDF to provide the requested service to the end user.

The physical level architecture of the intelligent network describes how the functional entities described above are located in the physical entities of the network. The physical architecture of the intelligent network is illustrated in FIG. 2, where the physical entities are described as rectangles or circles and functional entities as ovals. The signaling connections are described by dashed lines and the actual transport which is for example speech, by continuous lines. The optional functional entities are denoted with dashed line. The signaling network shown in the Figure is a network according to SS7 (Signaling System Number 7 is a well-known signaling system described in the CCITT (nowadays ITU-T) blue book *Specifications of Signaling System No. 7*, Melbourne 1988).

The subscriber equipment SE which can include, for example, a telephone, computer, or telefax, are connected either directly to a service switching point SSP or to a network access point NAP.

The service switching point SSP provides the user with access to the network and handles all necessary selection functions. The SSP can also detect any IN service request. Functionally, the SSP includes the call control and service selection functions.

The network access point NAP is a traditional telephone exchange that includes the call control function CCF, for example, the Applicants' DX 220 exchange which can differentiate calls that require IN services from traditional calls and route the calls that require IN services to the appropriate SSP.

The service control point SCP includes the service logic programs SLP that are used to produce the IN services. The shorter term service program will also be used for service logic programs in the following.

The service data point SDP is a database containing customer and network data which is used by the service programs of the SCP to produce tailored services. The SCP can use SDP services directly via the signalling or data network.

The intelligent peripheral IP provides special service, such as announcements and voice and multiple choice recognition.

The service switching and control point SSCP consists of the an SCP and SSP located in the same network element (in other words, if the SSP network element shown in the drawing contains both an SCF and an SSF entity, the network element in question is an SSCP).

The tasks of a service management system SMP include the management of the database(SDP), network monitoring and testing, and collecting network data. It can connect to all other physical entities.

The service creation environment point SCEP is used for specifying, developing and testing the IN services, and for entering the services in SMP.

The service adjunct AD is functionally equivalent to the service control point SCP, but it is directly connected to SSP with a fast data connection (for example, with an ISDN 30B+D connection) instead of via the common channel signalling network SS7.

The service nodes SN can control the IN services and perform data transfers with users. It communicates directly with one or more SSPs.

The service management access point SMAP is a physical entity which provides certain users with a connection to SMP.

The above is a brief description of the intelligent network as a background to the description of the method according to the invention. The interested reader can get a more detailed description of the intelligent network in, for example, ITU-T specifications Q.121X or in the AIN specifications of Bellcore.

It should be possible to provide IN-based services to subscribers in fixed or mobile networks in a way enabling provision of tailored service in such a way that a specific subscriber-associated combination of service features can be offered to each individual subscriber as easily as possible. All services provided to customers or subscribers consist of one or more service features SF. A service features is the (smallest) component, visible to the customer or subscriber, that the service obtained by him/her comprises. The subservice, for which the above term "service feature" is employed in the international standards, is termed a feature in the present context.

From the point of view of service designers, an intelligent network is divided into service independent building blocks for which the abbreviation SIB is used. The SIBs are blocks from which service designers assemble service features and services. In other words, SIBs are the smallest blocks from which services and service features are assembled. A service consists of several service features and a service feature again consists of several SIBs, even though in some cases a service feature may consist of only one SIB.

The international standards define the service independent building blocks of which services shall be composed. When, moreover, the situation has been such that network operators have wanted new services in their networks as fast as possible, it has been thought that this task can best be fulfilled when the actual service logic programs are implemented as modules complying with the block division specified in the standards. Thus, one has started to implement service programs as functional blocks (modules) that correspond to the SIBs specified in the standards as closely as possible.

However, such a solution has proved difficult, since it is necessary to implement within the blocks also a lot of functionality that is not directly related to the service logic needed by the subscriber but serves the internal function of the network element. In addition to INAP messages arriving from the network, other messages internal to the network element must be used, wherewith information not included in the INAP messages—e.g. parameters of the data tables of the network element—is transmitted. Furthermore, it must be possible to exchange e.g. error and acknowledgement messages between the service logic programs and the network element platform.

Therefore, in the present situation it is difficult to create new tailored services. The difficulty will be enhanced even more if services are needed rapidly for example for temporary use.

SUMMARY OF THE INVENTION

It is an object of the invention to eliminate the above-described drawback and to provide a solution wherewith the implementation of services can be made simpler and faster than heretofore.

This object is achieved with the method in accordance with the invention, which is defined in the independent claim.

The idea of the invention is to use a dedicated messaging SIB for each different type of message to be sent to the network, and each time the message to be sent is such that a related response must be awaited before the service logic is continued, a generic halt state SIB is used that receives said response. The idea is thus to divide network functions in a novel way into building blocks (SIBs) and additionally to use these building blocks in such a way that a block sending a message of a given type is always succeeded by a block of a given type (generic halt state block) in which a message of said type is awaited from the network.

On account of the solution in accordance with the invention, a very significant relief is achieved in the implementation of services, since the service logic needed by the subscriber or customer can be clearly distinguished from the internal logic of the network element, and the internal logic of the network element can be made transparent to the producer of the service. This is due to the fact that the reception logic required by all possible responses need no longer be placed within the building blocks of different types when one is awaiting a specific message from the network within the block.

A further advantage of the solution of the invention is that operators can easily create different services for examples for temporary test use in order to test the services for example before one starts creating a management system for them.

BRIEF DESCRIPTION OF THE DRAWINGS

In the following, the invention and its preferred embodiments will be described in greater detail with reference to examples in accordance with the attached FIGS. 3 . . . 13$h$ in the accompanying drawings, in which.

DETAILED DESCRIPTION OF THE INVENTION

When a network subscriber initiates a call, the terminal exchange of the subscriber first receives information on the calling subscriber's desire to place a call. This information can arrive at the exchange for example as a Setup message in accordance with standard Q.931. If the terminal exchange is not an SSP exchange, it can route the call attempt to an SSP exchange.

When the call control of the SSP exchange detects that a subscriber is concerned who needs IN services, transfer of the control to the IN is triggered and processing of the call attempt is "frozen". The SSP exchange then sends to the SCP an Initial_DP message, which is a standard message between the SSF and SCP, generated by the SSF upon detecting at any detection point of the call state model that a service request is necessary (a detection point is a point in the call state model at which the control can be transferred to the IN). Initial_DP is thus the message that starts the dialog between the SSP and the SCP relating to the provision of each service. The information elements included in the message by the SSP exchange include at least the calling and called number and a service key.

An INAP (Intelligent Network Application Part) message set is used between the SSP and SCP. (The message set is described for example in the standard ETSI IN CS1 INAP Part 1: Protocol Specification, Draft prETS 300 374-1. November 1993, to which the interested reader is referred for a more detailed exposition.) No actual protocol has been defined in the standards, only the messages used. In addition to optional parameters, also so called extension parameters have been defined in the messages. Particularly the last-mentioned are parameters for which different operators desire data content definitions of their own. For this reason, the SCP network element must have a large number of service logic programs SLP for implementing different services. Hence, the different service logic programs may use messages of the same INAP message set, but in a different order and with different parameter values. The actual protocol level in the communication between the SSP and SCP is thus represented by these different service logic programs. Each service logic program sends to and receives from the network INAP messages.

Figure 3:
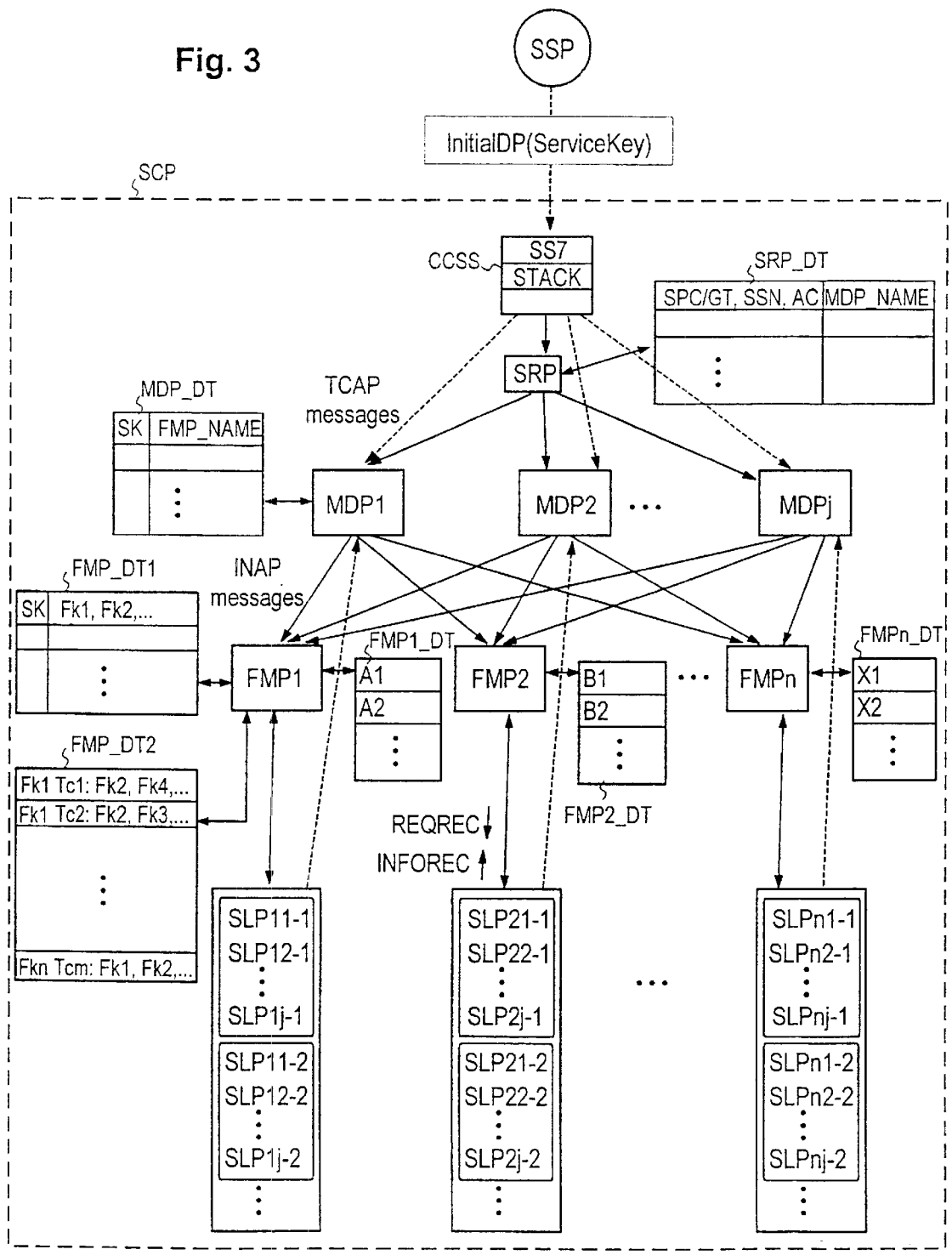
FIG. 3 illustrates the functional architecture of an SCP network element in accordance with the invention when parts essential to the service logic software are looked at, FIG. 4 illustrates the content of an object-related data raw.

FIG. 3 illustrates the functional architecture of an SCP network element in accordance with the invention seen from the point of view of the service programs. The service requests arriving at the network element come through a common channel signalling stack CCSS to the receiving program block SRP (SS7 Receiver Program). One such receiving program block is provided for each common channel signalling stack of the SCP network element. For simplicity, the example of the figure only shows one stack and one receiving program block.

If one SCP network element is connected to more than one SSP network element in which different versions of the INAP message set are used, the definition of the data content of the data messages received by the SCP is different depending on which SSP the SCP is communicating with. For this reason, further processing of the messages from the receiving program block onwards must in practice be differentiated in accordance with which INAP message set is concerned. Thus, what is also essential is that the receiving program block SRP is independent of the INAP message set employed.

The receiving program block SRP receives from the network (from SSF entities) standard TC_BEGIN messages. The task of the program block is to identify the relevant INAP message set version on the basis of the TC_BEGIN message and to forward the INAP messages contained in the component primitives further to the message distributor program block MDPi corresponding to said message set, wherein i=1,2, . . . j and j is the number of different INAP message sets used.

Hence, at the level next to the receiving program block the network architecture includes program blocks MDPi (i=1, . . . j), one for each INAP message set used. Each distributor program MDPi receives TCAP messages from the network and forwards INAP messages, receives INAP messages from the service logic programs, and sends TCAP messages to the network. (A TCAP message comprises a header and one or more component primitives. Each component primitive can contain one INAP message at most. Each component primitive also has a subheader of its own. All of these header parts are produced when messages are sent to the network and they are removed when messages are received from the network.)

When an initiation request for a service dialog—which arrives as a TC_BEGIN primitive (containing an Initial_DP message)—is received on a network element, a new instance of the receiving program SRP is created that will search the correct distributor program block, create an instance thereof for the use of said service request, and transmit a TCAP message to said instance. Thereafter the instance of the receiving program block is deleted. The distributor program instance receives all TCAP messages subsequently arriving from SSP. The search for the correct distributor program takes place in such a way that the receiving program block SRP reads from the header of the TC_BEGIN message either the identifier of the sending SSP network element (SPC, Signalling Point Code, or GT, Global Title) and additionally the identifier of the subsystem (SSN, SubSystem Number), or alternatively the relevant application context identifier AC, and searches on the basis thereof from the data table SRP_DT of the SRP level the name of the distributor program, MDP_NAME, corresponding to the INAP message set in question.

Thus, the architecture of the SCP exchange includes for each INAP message set a dedicated program block MDPi, the task of which is to decode the received messages (at least Initial_DP message containing the service key parameter) and to distribute the messages to their correct receivers.

In the functional hierarchy of the network element, the main program blocks are located at the nest hierarchy level after the distributor programs. These main program blocks are denoted by FMPi (Feature Manager Program). The main program blocks constitute the processes controlling the actual service logic programs SLP, supplying them with the data they need. Thus, the main program blocks are responsible for managing the services and features.

The message distributor programs distribute each service request to the correct main program block. To enable this, there is a dedicated data table MDP_DT for the distributor programs, in which the service key value SK is presented at the beginning of each data row as a search key. On the basis of the service key value that arrived in the Initial_DP message, the distributor program block searches from the data table the correct row in which it finds the identifier of the main program block (FMP_NAME) that serves as the recipient in the case of said service key value. The data table is preferably common to all distributor program blocks MDPi. Having found the correct main program block, the distributor block instance creates therefrom an instance for the use of said service request and forwards an INAP message to said instance.

Since service logic needs are different for different object types, it is advantageous to implement the SCP network element in such a way that it has separate main program blocks for the logically distinct main object classes contained in the SSP exchanges. Said classes may include calling subscriber class, called subscriber class, destinations (beginning of dialled number), sub-destinations (the entire dialled number), routes, circuit groups, etc. Furthermore, the subscribers may be in different classes according to which network they belong to (for example a fixed network or mobile network). Objects in this context denote such network-related entities to which information can be attached in the network element—e.g. in the case of an intelligent network in an SSP network element—indicating, for an individual call attempt, whether a service request is to be sent to the network element offering services (which in the case of an intelligent network is an SCP network element).

As stated previously, each distributor program block utilizes the service key parameter that arrived in the service request message to define the receiving main program block. This means that for service requests relating to a given main object class (e.g. calling subscribers), the SSP exchange has to set a service key value that is different from the service key value of objects belonging to another class (e.g. called subscribers) (even though service of the same type is concerned). A wide variety of service key values may correspond to a given main program block, but the service key value sets relating to two different main programs may not overlap.

Each main object class has a dedicated data table FMPi_DT (i=1,2, . . . n). These data tables will be termed main tables in the following. Thus, the SCP network element has a dedicated main table for each main program block. Each main table has one data row for each object belonging to said class. For example, the data table (FMP1_DT) used by the main program block FMP1 relating to calling subscribers has one data row for each calling subscriber Ai (i=1,2 . . . ), the data table (FMP2_DT) used by the main program FMP2 relating to called subscribers has one data row for each called subscriber Bi (i=1,2 . . . ), the data table used by the main program relating to subdestination objects has one data row for each subdestination in use, the data table used by the main program relating to destination objects has one data row for each destination in use, etc.

Figure 1:
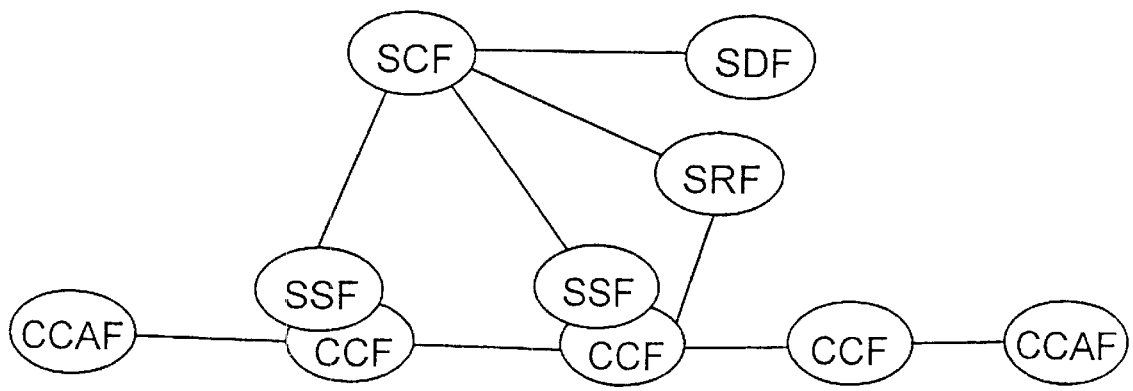
FIG. 1 illustrates the functional architecture of an intelligent network.
Figure 4:
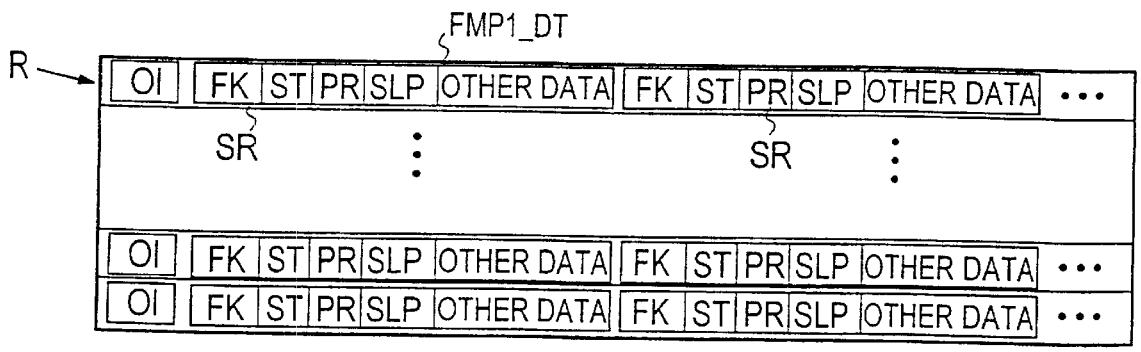

In each row of the main tables, information is stored in the manner shown in FIG. 4, defining what kind of feature set said object has activated. An object identifier Oi is stored at the beginning of each row R as a search key. The main program block searches the correct row from its data table by means of the value of the object identifier contained in the INAP message. The row contains successive subrecords SR, one for each feature. At the beginning of each subrecord, there is a field FK containing a feature key Fki (i=1,2 . . . ), indicating which feature is concerned. Thereafter the subrecord may have for example a status field ST, containing information on whether said feature is active or passive, and a priority field PR, containing a priority number. These priority numbers of subrecords indicate the relative order of execution of the features. Each subrecord further has at least field SLP, containing the identifier of the service logic program that executes said feature. The service logic programs form the lowest hierarchy level of the network element.

Preferably there are dedicated service programs for each main object class. Furthermore, there is a clone of each program dedicated to each INAP message set (i.e., each distributor program). In the figure, the service programs are denoted with reference SLPxy-z, where x indicates the main object class to which the program belongs, y indicates the INAP message set to which the program belongs, and z indicates the consecutive number of the program within the main object class.

In accordance with the hierarchy of the network element, the instance (SLPi) of the lowest level of one service request dialog is called a child, the instance of the next level (FMPi) is called the parent, and the instance (MDPi) of the level next to that is called the grandparent. An older instance always begets the younger instance.

In practice, one feature implemented by a service logic program may be for example playing of an announcement to the subscriber ("play an announcement") or an operation by which the calling subscriber is requested to dial additional numbers ("prompt and collect user information"), or a connect operation (a CONNECT message is sent to the SSP exchange, by which the SSP exchange is requested to connect the call to a given address).

The order to execution of the features can be indicated for example in the above-stated manner by adding a priority number field PR to the sub-records, in which case said numbers indicate the relative order of execution of the features. There are also other alternatives for achieving the correct order of execution, as will be seen hereinafter. This way, however, is simple and makes it possible that the same service key value can indicate a different order of execution e.g. for two different calling subscribers.

In addition, one or more separate data tables are provided for the main program blocks, having a data row for each service key value that is in use in the domain of several different main program blocks. The example in the figure has one data table FMP_DT1 that is common to all program blocks (all main program blocks read said data table). At the beginning of each data row in the data table, the service key value SK is provided as the key. Each row contains data on the features Fki (i=1,2 . . . ) relating to said service key value, that is, on the services that are allowable features in the case of said service key value. Furthermore, the row may contain information as to in which order these features are executed, or the order of the feature keys may directly indicate the relative order of the features. The main program block reads from this data table the row corresponding to the received service key value, whereby it finds the set of features that are allowable features in the case of said value. Thereafter the main program block reads from its dedicated data table FMPi_DT (i=1,2 . . . ) the row corresponding to the identifier of said object (e.g. calling subscriber). From this row, the main program block finds the identifier of the service logic program SPLi (i=1,2 . . . ) that is to be started. From the row of the class-specific table FMPi_DT (for instance the table of calling subscribers), the main program block takes into consideration only those features which relate to said service key value (i.e. the ones belonging to the allowable set searched above), and of these eventually only those indicated as active at said object.

At this stage of execution of the service request, the features relating to the object and their relative order of execution are known. Thereafter the main program block produces an instance of the service logic program corresponding to the feature that is the first in turn and requests it to start execution of the service.

The FMP instance thus sends an Initial_DP message to the service program which has the highest priority and whose identifier the main program block read from the relevant subrecord of the object-related row. First, however, a separate request message REQREC is sent to said SLP instance, since the Initial_DP message must be sent in its standard format (ASN.1 format) in which its information content is not sufficient. The service logic program thus needs also other data in addition to that contained in the INAP message, for example the value of the feature key, which it receives in the request message.

Figure 5:
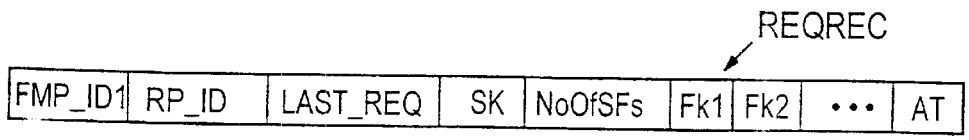
FIG. 5 shows the structure of a request message sent to a service program instance.

FIG. 5 shows an example of the data structure of the request message sent. The request message first has a field FMP_ID1, containing the identifier of the sending FMP instance. Thereafter follows a field RP_ID, containing the identifier of the program block to which the SLP should send its messages relating to this dialog. These acknowledgement messages can be sent both to the FMP instance (parent) and the MDP instance (grandparent). By sending acknowledgement messages to the distributor program instance, the load on the main program blocks can be diminished, since the MDP instance attends to the sending of outbound messages to the network in any case. The next field LAST_REQ contains a Boolean variable indicating whether still another request message is bound for the SLP instance after it has executed the features which were requested in that request message. The field SK contains the service key value obtained from the SSP network element. The next field, NoOfSFs, indicates the number of features contained in the request message, and the fields Fki (i=1,2 . . . ) subsequent to said field contain the keys of said features. The last field AT contains a description of how the service dialog is to be terminated if the execution of the features fails.

The structure of the service programs is such that they are composed of parts each of which executes a given feature. Thus each SLP executes only those features whose feature keys arrive in the request message. If more than one feature belonging to the allowable features is active in the object-related row and the same SLP identifier is related to all said features, the FMP can send all these feature keys in one request message )providing that it is otherwise allowable to execute all said features in succession). If the features contain the identifier of several different SLP programs, the FMP instance sends request messages to said SLP programs in the order indicated by the subrecords in the object-related row. The procedure may also be such that only one feature key is sent in one request message.

Having executed the feature, the SLP sends an acknowledgement message INFOREC to those elements (parent and/or grandparent) which are indicated in the request message REQREC. In the acknowledgement message, the SLP instance also indicates in what manner the feature was terminated. If, for example, the execution of the feature fails, the feature to be executed next can be different compared to a normal case in which the execution of the feature is successful.

Figure 6:
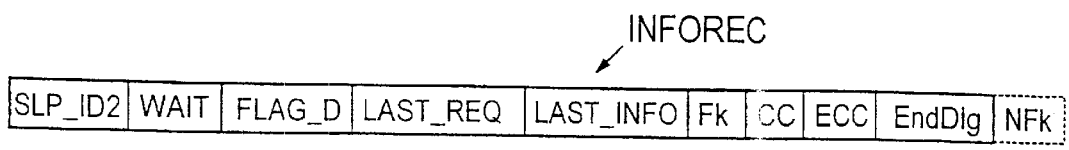
FIG. 6 depicts the structure of an acknowledgement message sent by the service program instance.
Figure 2:
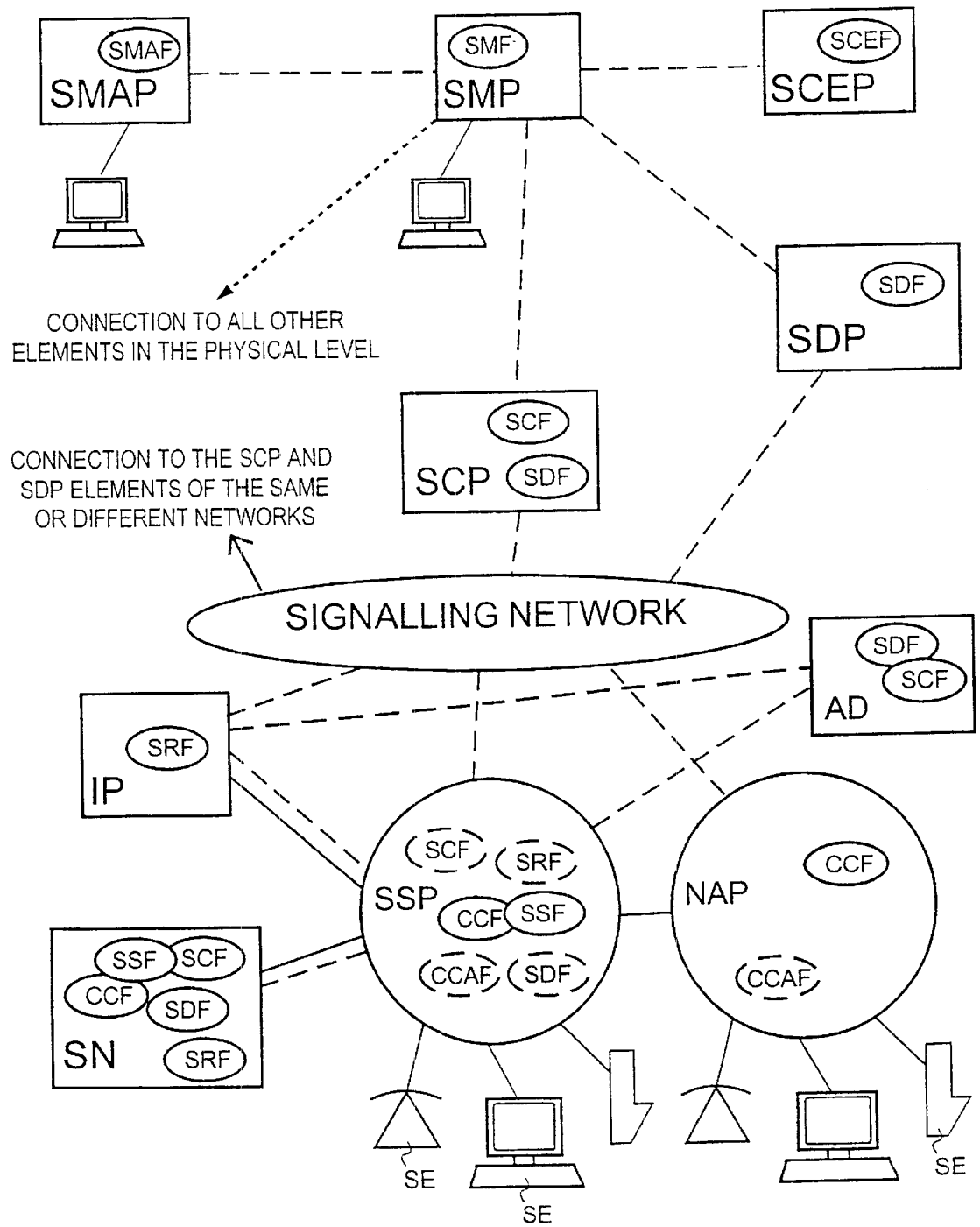
FIG. 2 illustrates the physical architecture of an intelligent network.

FIG. 6 illustrates one possible structure of an acknowledgement message INFOREC sent by an SLP instance. The first field SLP_ID2 indicates the identifier of the sending SLP instance. The next field WAIT contains for example information on whether a response is awaited from the network before the service can be continued. The field FLAG_D contains a Boolean variable indicating whether the SLP instance terminates itself after sending of an acknowledgement message or not. The field LAST_REQ again contains the same information that the child has last received from the parent in said field (the grandparent thus also receives said information). The next field LAST_INFO again contains a Boolean variable indicating whether the SLP instance has completed the last feature of the request message it received. The next field Fk contains the key of the feature in which said message arrives as an acknowledgement. The field CC contains the termination code of the feature just completed. The field ECC can indicate slight errors for which a separate error message need not be sent. The field EndDlg contains information on in which way said SLP instance desires its grandparent to terminate said dialog. The dialog can have different ways of termination, for example depending on whether a message is desired to be sent to the network, or if a message is sent, what information elements are included in the TC_END primitive to be sent.

In a preferred embodiment of the invention, the acknowledgement message further contains a field NFk, in which the key of the feature that should be executed next can be indicated. This field and its use relate to a preferred embodiment of the invention that will be described hereinafter.

Since the internal messaging within the network element does not relate to the actual invention, it will not be described in detail in this context. What is essential for the invention is that the service program instances receive both internal messages and messages arriving from the network (INAP messages), that the (internal) request and acknowledgement messages are used to attend to the execution and concatenation of the features, and that the acknowledgement message can also be used to indicate how the execution of the feature succeeded and possibly also which feature is to be executed next.

Figure 7:
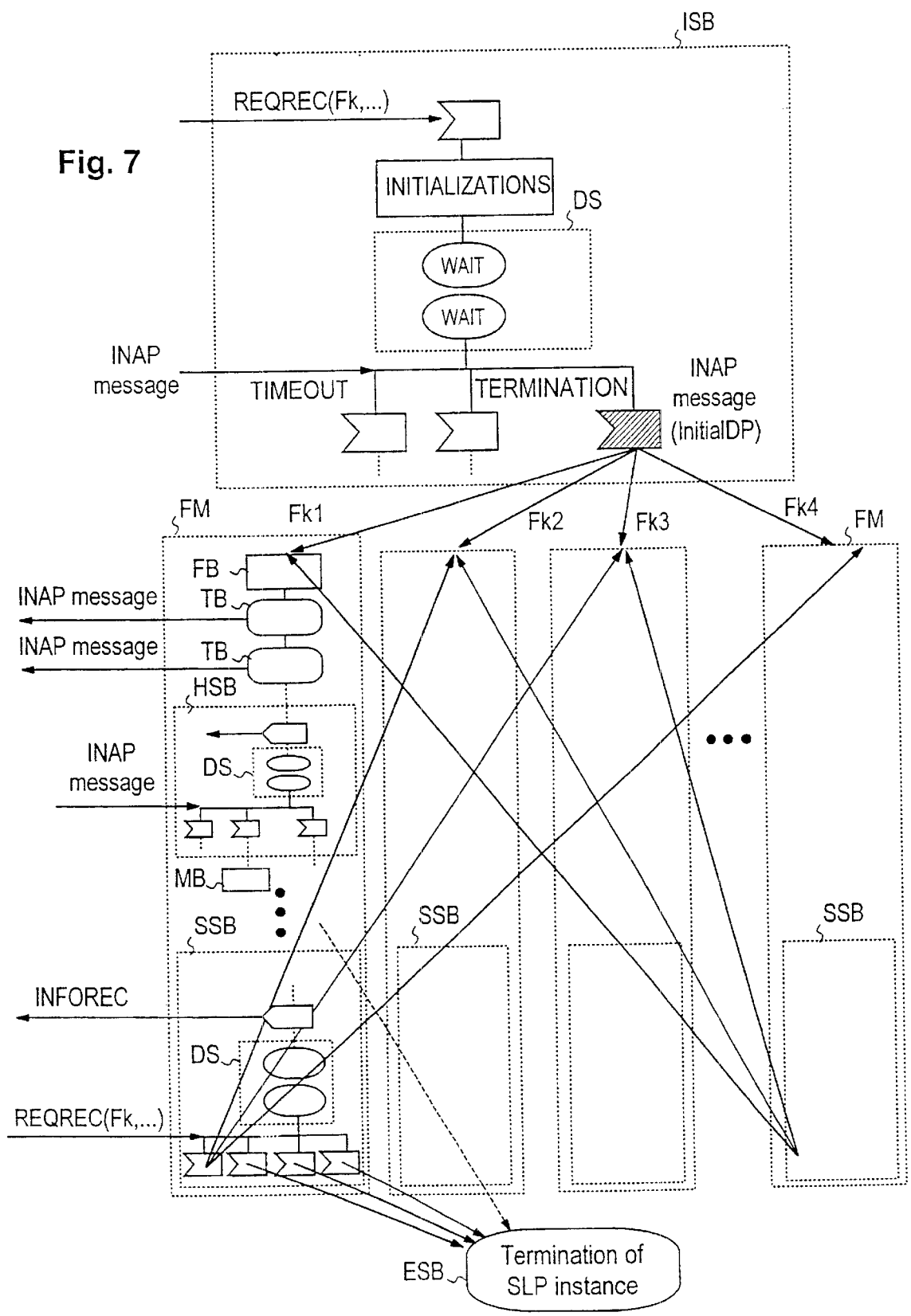
FIG. 7 illustrates the functional configuration of one service program.

In the following, the basic configuration of one service logic program SLPi will be described with reference to FIG. 7. Each SLP comprises an initial state block (i.e., initial state SIB), one or more feature modules FM, and an end state block ESB (i.e., end state SIB). There are typically several parallel feature modules, but the initial state block and end state block are common to all parallel feature modules of a service program. Of these blocks, the term state block is used, on the one hand because they contain a delay state in which a response from the outside is expected and on the other hand because the service programs do not elsewhere contain such delay states in which an event is awaited.

Each SLP starts with a generic initial state block ISB the task of which is to receive the service dialog initiation message arriving from the network and to direct the execution of the service to the start of the correct feature. The sending main program block sends a request message REQREC (containing, in accordance with the above, for example one or more feature keys Fk) and the related actual INAP message (that has arrived from the network) in succession. For this reason, the initial block has a delay state DS in which the SLP instance awaits after the request message the related Initial_DP message. When the Initial_DP message arrives, the execution of the program branches off to one of the feature modules FM in accordance with the key of the feature to be executed first. The initial state block further performs various initialization tasks that are the same for all service programs. Under the delay state DS the service logic also needs at least a branch for processing a timeout message possibly received, indicating that the INAP message has been awaited for too long, and a branch for processing a termination message internal to the network element, by means of which the execution of the service is terminated for example on account of an error. During the execution of the service, the network element may also receive from the network an error message relating to said service dialog, as a result of which the service has to be terminated. In these error situations, the routine enters the end state block ESB directly.

After receipt of the InitialDP message in the initial state block, the service proceeds to one of the feature modules FM. The start of a feature normally comprises a function block FB in which the information contained in the initiation message is processed.

The execution of the service logic employs a dedicated messaging block (messaging SIB) for each message of different types that is sent from the service program to the network. In general, the function block at the start of the feature is succeeded by one or more of such messaging blocks. The purpose of the function block preceding the messaging blocks for its part is to prepare the data that is set in the information fields of the messages in the messaging blocks.

If any one of the messaging blocks is such that a specific response that is always received for said message in the case of faultless operation is awaited to said type of message, a generic halt state block HSB is added after the messaging block, in which the service logic awaits the response expected by the service logic (an INAP message of said type) from the network. Genericity means that the code used to implement the block is the same irrespective of at which point of the service program or in which service program the block is located. Only the variable given as entry information to the block, indicating the type of message awaited, is block-specific, since it is dependent on the type of the message sent to the network previously.

Some of the messages sent are such that they always receive a response message in connection with normal (faultless) operation, and one must await the response prior to proceeding with the execution of the service. Such response messages will be termed synchronous responses in the following. Some of the messages sent for their part are such that the execution of the service logic is continued without awaiting a response. When such responses arrive from the network on the SCP network element, the service program receives them in any suitable delay state, even though it is not awaiting in a specific halt state. Such response messages will be termed asynchronous responses. Some of the messages sent for their part are such that no response message to them arrives. Asynchronous messages also include error messages from the network, which can arrive at any time, and additionally such internal messages that can arrive at any time, for example internal termination messages. Each halt state block instance is capable of receiving, during waiting, any asynchronous response (possibly) arriving prior to a synchronous response.

Each feature module FM can contain one or more halt state blocks (and each halt state block can have one delay state in which a response is awaited).

Each instance of the halt state block is thus capable of receiving all possible messages that may arrive during the halt state. For this reason, the service logic must branch off at the end of the halt state block according to the type of the message received in the halt state. Consequently, it is possible to use in each such receiving branch a generic message preprocessing block MB, containing the functions that transfer the information received in the message to the use of the service program. In other words, in the preprocessing block the values of the parameters received in the message are transferred to the corresponding variables. One such preprocessing block is provided for each message type.

Furthermore, at the end of each feature module FM there is always a separate stop state block SSB, which indicates the end of a given feature before the start of the next feature or before the termination of the SLP instance. An acknowledgement message INFOREC is sent from the stop state block about the execution of the feature. On the basis of the termination code Tc contained in the acknowledgement message (in field CC), the main program block may e.g. define the next feature module and send to the stop state block the next request message REQREC, which contains the keys Fk of the features to be executed next (one or more keys). Hence, at the end of the stop state block a (new) feature key acts as a branching variable. From the point of view of the service logic, the stop state block thus serves as a switch that switches the service to proceed at the correct feature module.

When there are not features to be executed and it is not necessary to await asynchronous responses, the process jumps to the generic end state block ESB, in which suitable termination messages can be sent to the network and for example storage operations for various counters can be performed and the SLP instance can be terminated. The end state block comprises the termination operations that are common to all services.

The number of different termination codes available is generally dependent on what feature is in question. In the simplest case, there may be only two termination codes: feature executed successfully or execution of feature failed. If the feature is connect, for example, the termination code may indicate e.g. these four different events: called subscriber free, called subscriber busy, called subscriber does not answer, and connection setup failed.

Figure 8:
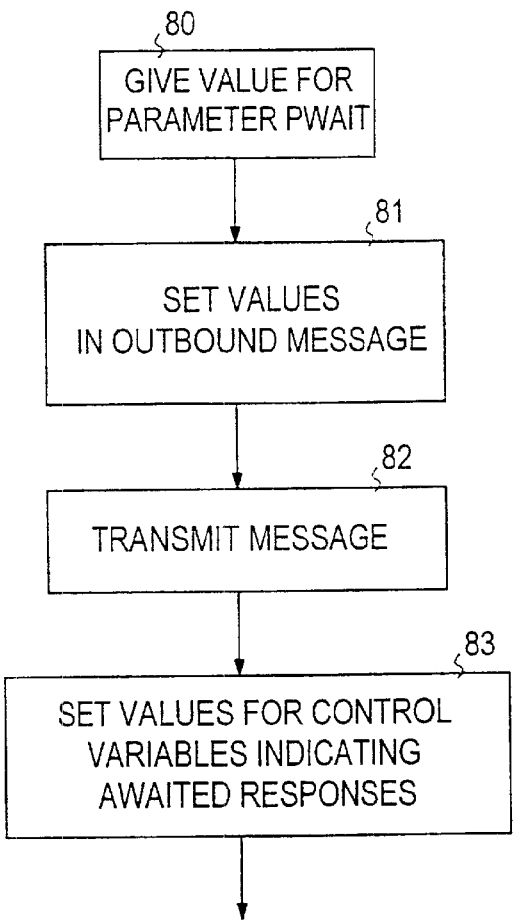
FIG. 8 illustrates the messaging block (i.e., messaging SIB) of the service program.

FIG. 8 illustrates the structure of one messaging block TB. In the messaging block, a value is first given to parameter PWAIT, which indicates whether a synchronous response is awaited to the message sent (step 80). This parameter receives e.g. The value one if a synchronous response is awaited and otherwise zero. Thereafter, values are set in the data fields of the outbound message (step 81) and the message is sent (step 82). When the message has been sent, the correct values are set for the control.variables indicating the responses awaited (step 83). The message may e.g. be of the type ApplyCharging, which is used in charging and has the operation code 35. To this message, an ApplyChargingReport message having the operation code 36 is awaited from the SSP. Thus, in step 83 the value of the variable indicating the type of the message awaited is set as 36. There is one messaging block for each message type to be sent to the network, i.e. in practice there are about 15 messaging blocks, which is the number of (standard) message types sent from the SCF to the SSF.

Figure 9:
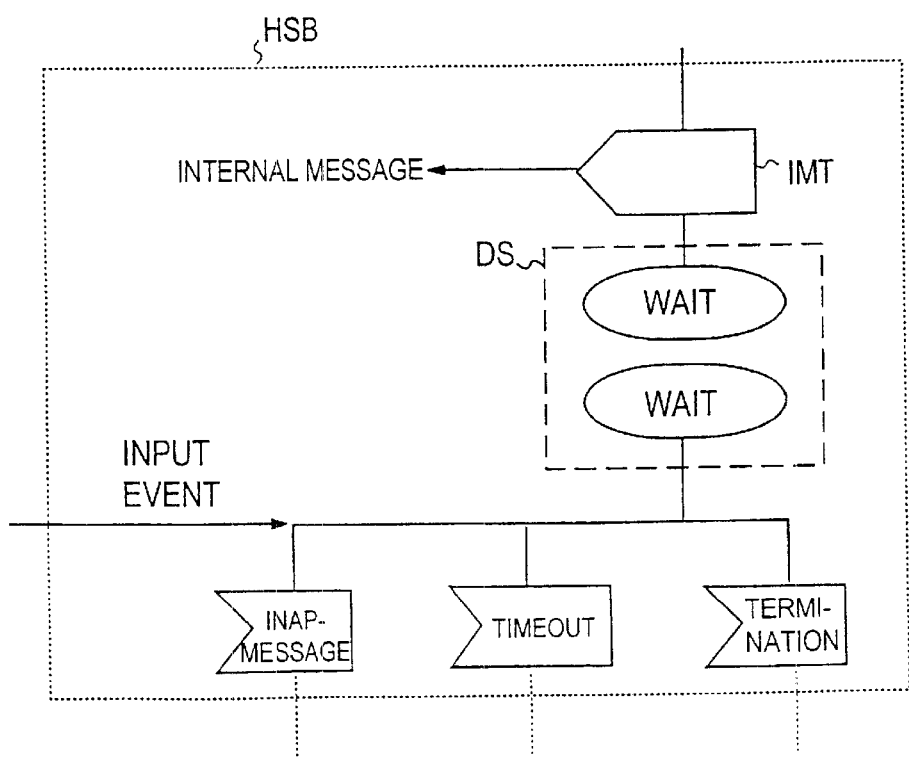
FIG. 9 illustrates the halt state block of the service program.

FIG. 9 illustrates the functionality of the halt state block HSB. In addition to the above, what is essential is that this block can include functions that are inessential to the actual service logic (needed by the subscriber). Such functions include transmission and reception of data messages that are not network messages (INAP messages) but messages internal to the network element, wherewith for example the timeouts or acknowledgements performed within the network element are handled. The halt state block thus has one or more internal message transmission blocks IMT, wherefrom a message internal to the network element is transmitted and at least one delay state DS, in which a synchronous response (a specific INAP message) is awaited (which is hence called a synchronous halt state). Under the delay state there are additionally—as above—at least branches for processing (a) a timeout message indicating that one has awaited too long in the delay state, and (b) a termination message internal to the network element, wherewith the execution of the service is terminated for example on account of an error. If an internal timeout or termination message or for example an error message arriving from the network is received, the routine enters the end state block ESB directly. Thus, the branching variable used at the end of the halt state block is the type of the received message.

The value of the parameter PWAIT can be given in the halt state block as well.

Figure 10:
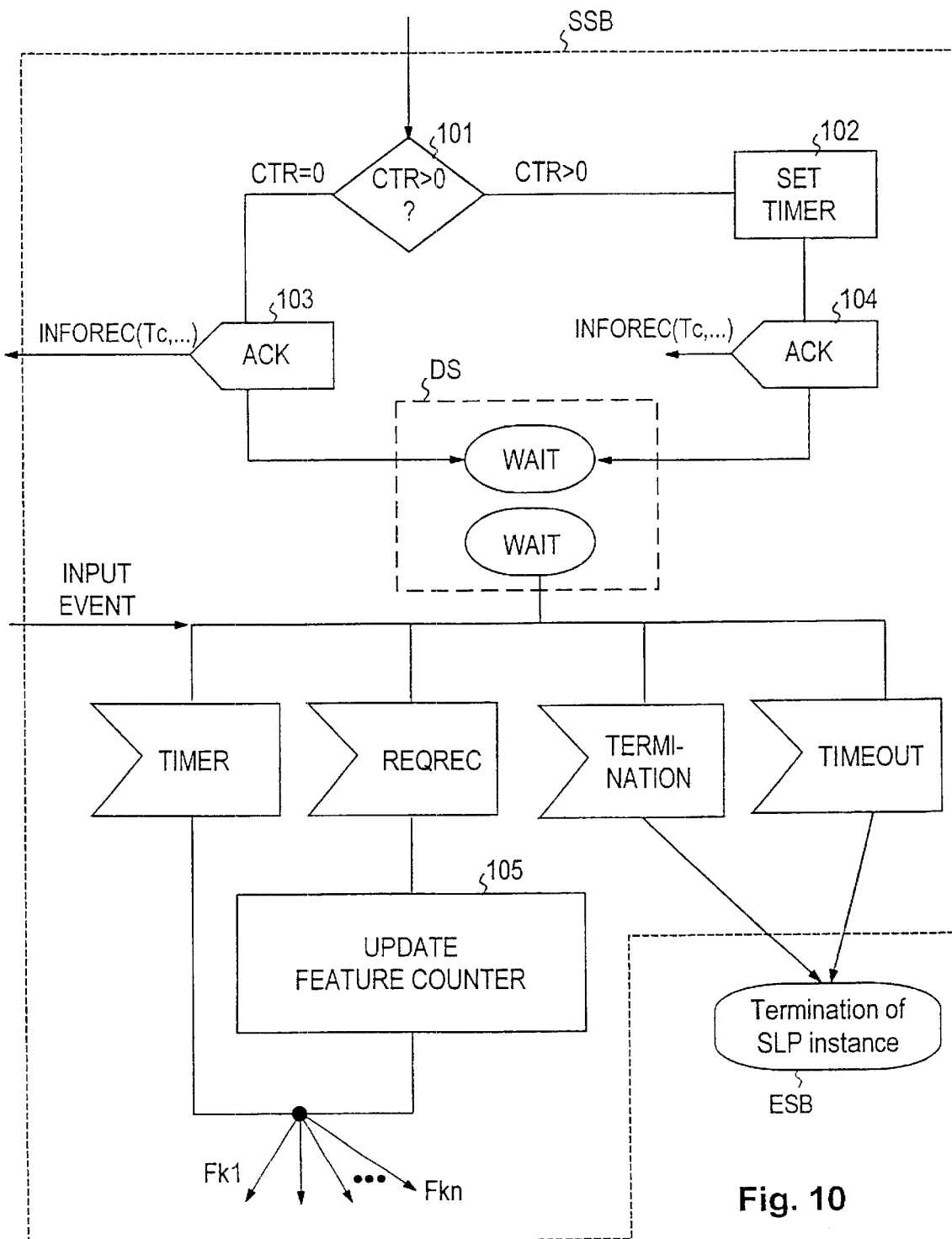
FIG. 10 illustrates the stop state block at the end of each feature.

FIG. 10 illustrates the stop state block SSB provided at the end of each feature module. It is tested at the start of this block (step 101) whether there are still features remaining, i.e. whether the value of the feature counter CTR is higher than zero. If this is the case, a timer measuring a given short time is set (step 102), an acknowledgement message INFOREC is sent (step 104), and a delay state is entered to await an entry event.

If there are no features remaining (CTR=0), an acknowledgement, message INFOREC (step 103) is sent and a delay state DS is entered to await an entry event.

In step 104, the acknowledgement message (field Fk) sent indicates to the main program that the service program still has features to perform, and thus the main program does not send a response message to the service program. Correspondingly, the acknowledgement message to be sent in step 103 indicates that the service program no longer has features to perform.

If there are still features to be executed, the entry even is a(n internal) message indicating that the timer set in step 102 has expired. In that case, the routine goes over to the start of the features indicated by the next feature key.

If a new request message REQREC is received from the main program block in the delay state, the feature counter (step 105) is updated, whereafter the routine transfers to performing the features indicated by the new request message. As above, there are also branches below the delay state that are intended for the processing of the possible timeout and termination messages.

If the keys of all features were sent already in the first request message, the main program sends, after the acknowledgement it received from step 103, a termination message in response to which the execution of the service logic transfers to the end state block.

If all feature keys are not sent at a time, but for example only one key per request message, and the service still has features to perform, a new request message containing the keys of the features to be performed next (one or more keys) is sent after the acknowledgement of step 103.

To find one or more features to be performed next, another data table FMP_DT2 (FIG. 4) common to a given set of main program blocks is used at the main program level. This data table indicates the mutual interaction of the features. The primary search keys in the data table are the feature key Fk and the termination code Tc. The table contains the possible features for each feature/termination code pair. In other words, the table always contains the set of features that is possible to perform next when the executed feature and its termination code are known. When the set of features that can succeed the feature just executed has been found in the table, the feature having the highest priority in the object-related data row (or in data table FMP_DT1) is selected from among said features as the one to be executed next. When this feature has been executed, a termination code is again received in the acknowledgement message, and thus a new feature set is again found on the basis of the termination code and the feature key, and the feature to be executed next is selected from this set on the basis of the object-related data.

To minimize the number of messages to be transmitted, it is advantageous to proceed in such a way that several feature keys can be sent in one request message every time it is known that said features can be applied in succession irrespective of what their termination code is. In that event, the main program must go through the non-executed features in the order of priority to check that the next feature is allowable with all termination codes of the preceding feature. If, on the other hand, the allowability of the next feature is dependent on the termination code of the proceeding one, the main program must execute the above check and selection operations and subsequently send a new request message.

It is also possible that on the basis of the termination code, only such features (one or several) that are not in the object-related row are found in the data table. This happens in exceptional situations when the termination code indicates that the execution of the service has not succeeded in the normal way. In practice, for example, a connect feature may succeed in a normal situation, but if for instance a calling subscriber did not provide a sufficient number of digits, a feature can be executed whereby the calling subscriber is requested to dial more numbers, or if the termination code indicates for example that the dialled number is not found, the service can continue with a voice announcement feature.

Generally, it can be stated that a service feature is implemented with successive blocks which include an initial state block (only for the first feature), a first number of function blocks, a second number of messaging blocks, a third number of halt state blocks, a fourth number of message preprocessing blocks, and a stop state block. The number of the messaging, halt state, and preprocessing blocks may also be zero. From the end state block ESB, there is no return to the same or a new service feature. The service does not necessarily end, however, when the end state block is entered for the first time, since the FMP is capable of generating a new instance of a new or the same SLP, if this is necessary to complete the service.

In the simplest case, the feature module (i.e., feature) comprises one function block, one messaging block and one stop state block (no halt state block). This is the situation for example if an initiation message arrives from the SSP exchange to the effect that the SCP network element need only send to the network a CONNECT type message (to which no synchronous response is awaited).

In addition to the building blocks described above, the service programs may comprise small auxiliary or special functions at most. A separate set of auxiliary building blocks can be defined for such auxiliary functions. Auxiliary blocks are thus blocks that comprise only very small functions, for example branching off in a service logic on the basis of individual data. Such branching off can be effected by means of one branching command, in which case the block containing said branching command is an auxiliary building block. One service independent building block belonging to this group, wherewith a jump directly to the end of the feature module is realized for example in an error situation, will be described hereinafter. This group may also include for example a SIB wherewith the identifier is compared to a reference value. Such a SIB is also defined in the international standards.

There can in practice be several dozens of different types of function blocks, but they are nevertheless such that no messages are sent therefrom to the network and no messages are received from the network (nor are internal messages received). A function block may be e.g. such that reads information from a database.

By means of the state blocks in accordance with the invention, service independent building blocks are formed for the reception of an initiation message (initial state block), reception of synchronous responses arriving from the network (halt state block), concatenation of features (stop state block), and for service termination operations that are the same irrespective of which service logic program is concerned (end state block). State blocks of the same type are similar in all service programs. Also the end state block terminating the service is called a state block, since in said block release messages must be sent to the network and a final response from the network (Callinformation Report, a message that the system must be capable of receiving even after a release message has been sent to the network) must be awaited (in delay state). Termination operations are carried out in the end state block also in cases where a jump is made from the middle of the feature module directly to the end state block to terminate the service.

The reception of all possible network messages is included in the initial state block, halt state block, stop state block, and end state block. More precisely, the reception of the initiation message is included in the initial state block and the reception of all other network messages in the other state blocks. The reception of synchronous responses is only included in the halt state block. Besides these four state blocks, there are not other delay states, and thus no delay states or reception logic relating to them need to be embodied in the other service independent building blocks.

The above is a description of the implementation of services in a case where all features can be executed in immediate temporal succession.

However, some services are of such a nature that this is not possible, but one must wait between two successive features before the execution of the service can be continued. The service may be such for example to calling subscribers who are credit customers, in which case the balance of the account must be checked in between during the call. During the service, one must possibly also await a specific event, for example the calling subscriber dialling more numbers. Even after all features have been executed, the SLP instance must possibly be kept alive because one must still await an asynchronous response from the network, for example information on the calling subscriber placing the receiver on hook.

It is advantageous to implement passing of such "idle time" in the service logic as a separate feature, in order that it can be constructed as a service independent building block. In accordance with a preferred embodiment of the invention, each service program has, in addition to the other feature modules, a special feature module for passing of such "idle time". This feature module is called the idle module.

The start of the idle module comprises an instance of the halt state block HSB in which reception of asynchronous responses takes place in a halt state in which no specific response has been defined as the synchronous response (as in the halt state blocks of the other feature modules), but the parameter indicating the type of the awaited message has the value zero. It is to be noted in this context that it must be possible to receive asynchronous responses in each instance of the halt state block, since the duration of the halt state may be so long that an asynchronous response, e.g. one indicating that the calling subscriber has terminated the call, may arrive during it.

Thus, the idle module has the capability of receiving all possible asynchronous responses arriving from the network and additionally internal asynchronous responses, such as expiration of timers. The service logic must branch off from the halt state block according to the type of the asynchronous response that arrives. The processing of the asynchronous responses could be performed within the idle module, but it is nevertheless advantageous to carry out the processing exterior of the idle module in separate feature modules, preferably one being provided for each possible asynchronous response. The processing should preferably be carried out exterior of the idle module, since the processing of asynchronous responses is not necessarily similar in all service programs.

Hence, a preferred additional embodiment of the invention includes special exception blocks enabling a jump to the end of the feature module and therefrom further to the start of the desired feature module, where the asynchronous response that has arrived is processed and from the end of which one can return, when necessary, to the start of the idle module. There is a dedicated exception block instance for each possible asynchronous response. The use of exception blocks has the advantage that thereby the code of the idle module IFM can be made identical in all service programs.

Figure 11:
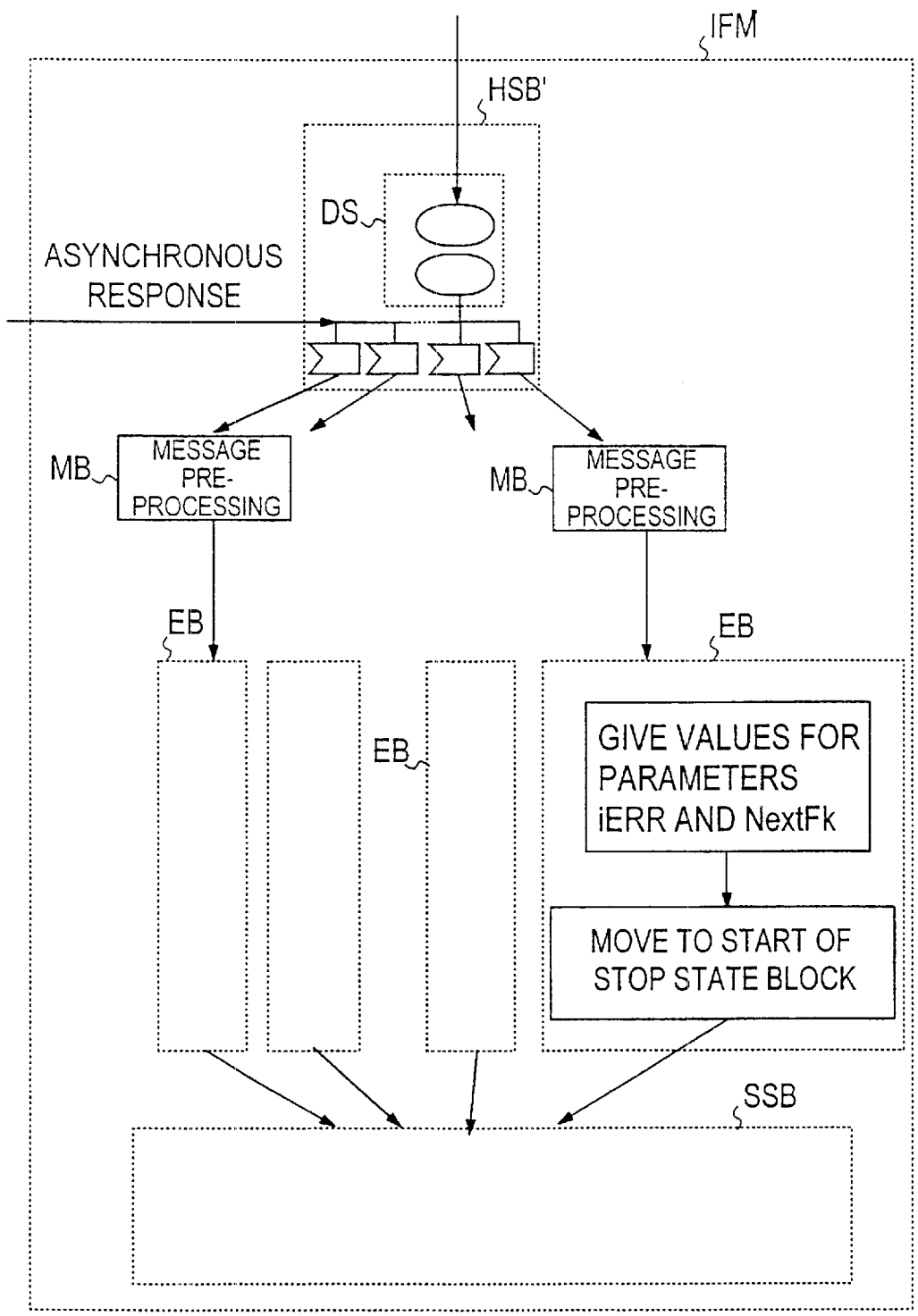
FIG. 11 illustrates a feature module in accordance with a preferred embodiment of the invention.

FIG. 11 illustrates the structure of an idle module IFM provided with exception blocks EB. From the halt state block HSB', in which all possible asynchronous responses can be received, the routine branches off after the message preprocessing block MB to a dedicated exception block instance EB according to the asynchronous response that has been received. As is shown in the figure for one exception block, in each exception block instance values are first given to parameters iERR and NextFk, and thereafter a jump is made directly to the start of the stop state block SSB located at the end of the feature module. The parameter iERR indicates whether the service logic has passed through the exception block and what kind of exceptional situation is concerned. The parameter NextFk again indicates the key of the service that is desired next.

The exception block can be used, in addition to the idle module, also in other feature modules if the service logic must branch off to an exception for example upon arrival of an error message. With the exception block, exceptions are handled in such a way that a jump is made to the end of the feature module and therefrom to the start of the given feature module.

The designer of the service program provides each instance having an exception block with an information parameter indicating the feature to whose start one must transfer next.

Figure 12:
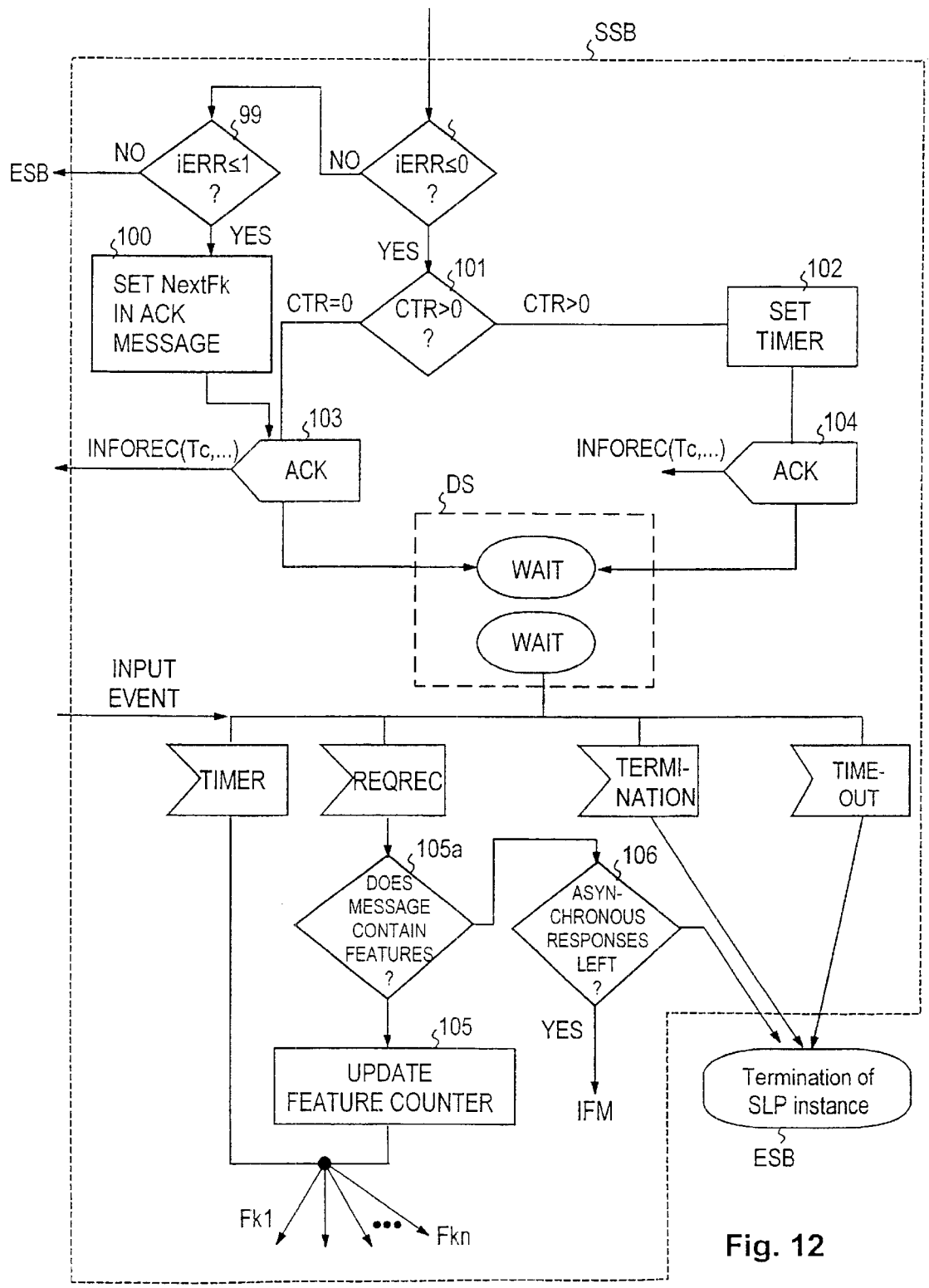
FIG. 12 illustrates a stop state block in accordance with a preferred embodiment of the invention, and FIGS. 13a . . . 13h shows a graphical illustration of blocks in accordance with the invention.

If exception blocks of the kind described above are used, a test has been added to the stop state block SSB in which it is tested whether the stop state block is entered directly from an instance of an exception block and if so, what kind of exception is concerned. FIG. 12 illustrates such a stop state block which is otherwise similar to that shown in FIG. 10, but steps 98, 99 and 100 have been added to the start of the block, and steps 105a and 106 have been added after the reception of the request message. At the start of the block, it is first tested (step 98) whether the stop state block is entered from an exception block. This can be effected in such a way that the parameter iERR has otherwise the value zero, but in the exception state block if receives a value higher than zero. For example the value on can indicate that an asynchronous response has been received that requires processing in a dedicated feature module, and the value two can indicate that an asynchronous response (for example a termination message) has been received that requires termination of the service (jump to the end state block). Hence, it is tested in step 98 whether the value of parameter iERR is smaller than or equal to zero. If this is the case (that is, the stop state block has not been entered directly from the instance of the exception block), the execution of the feature proceeds in the manner described above. If the parameter has a value higher than zero, step 99 is proceeded to, in which it is tested whether the parameter has a value smaller than or equal to one (i.e whether the value is exactly one). If the parameter has previously been given the value one, the routine proceeds to step 100, in which the value of the parameter NextFk is set in field NFk of the acknowledgement message and step 103 is proceeded to, in which an acknowledgement message is sent. If the parameter iERR has been given a value higher than one, the routine proceeds directly to the end state block ESB.

If the main program block permits the execution of the feature (NextFk) contained in the acknowledgement message as the next feature, it sends a request message REQREC containing said feature key.

In a situation where all features have been executed, the main program block can also send, instead of a termination message, a request message comprising no feature key. In such a case, it is checked from the request message (step 105a) whether it contains feature keys. If there are no feature keys, it is checked whether there are still asynchronous responses to be received from the network (step 106). If this is the case, the routine proceeds to the idle module to wait. If there are no pending responses, the routine proceeds to the end state block.

Thus, the service is terminated (the end state block is entered) when in the stop state block a situation is encountered in which (a) the main program block sends a termination message, or (b) there are no features remaining and no pending asynchronous responses either, or (c) if an internal timeout message indicating that one has awaited for too long in the delay state is received.

The feature to be executed next need not necessarily be defined in the acknowledgement message; if for example the parameter iERR is given the value 2, the service logic proceeds directly to the end state block. Such values are used in situations in which the asynchronous response received in the halt state block HSB' is such that the execution of the service is to be terminated immediately.

Each service program is thus constructed of SIBs that can be classified into the following classes according to how the different functions have been divided among them:

state blocks ISB, HSB, SSB and ESB, messaging blocks TB of messages, preprocessing blocks MB of received messages, function blocks FB, and auxiliary and special blocks.

Figure 13A:
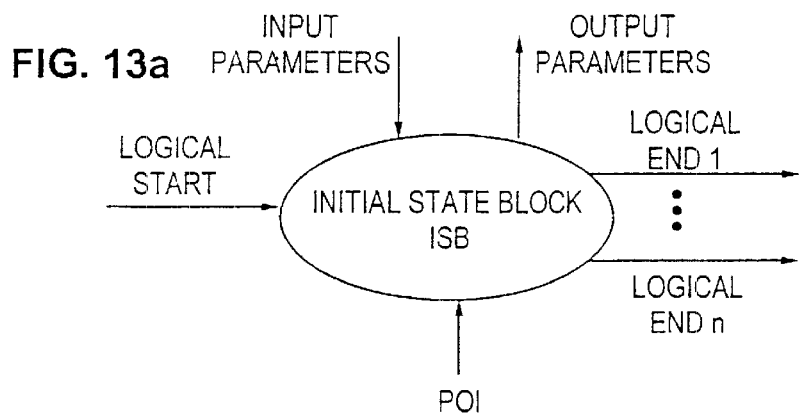

FIGS. 13a . . . 13h depicts these blocks graphically on a generic level similarly as the blocks are graphically represented in the international standards.

Each SIB has given input and output parameters belonging to three classes for which the abbreviations CID, SSD and SID are used. CID (Call Instance Data) parameters are dynamic parameters that vary from one call instance to another, SSD (Service Support Data) parameters are feature-specific parameters. SID (Service Instance Data) parameters for their part are parameters relating to the profile of the service subscriber. The input and output parameters are denoted with arrows above the block. In this respect, none of the blocks in accordance with the invention differ from the generic SIB description presented in the standards, but the input and output parameters of all blocks can belong to one or more of the above classes.

Figure 13B:
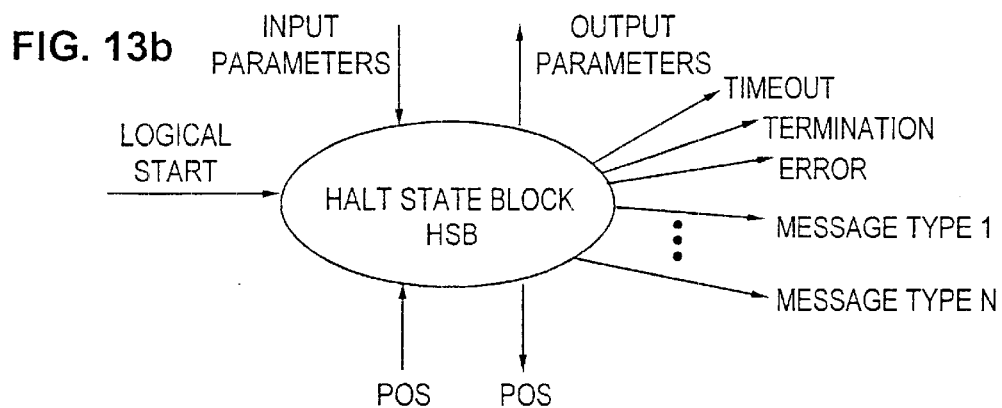
Figure 13C:
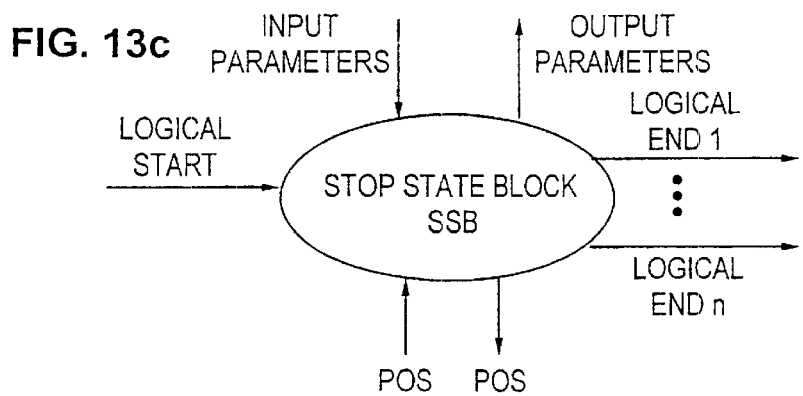
Figure 13D:
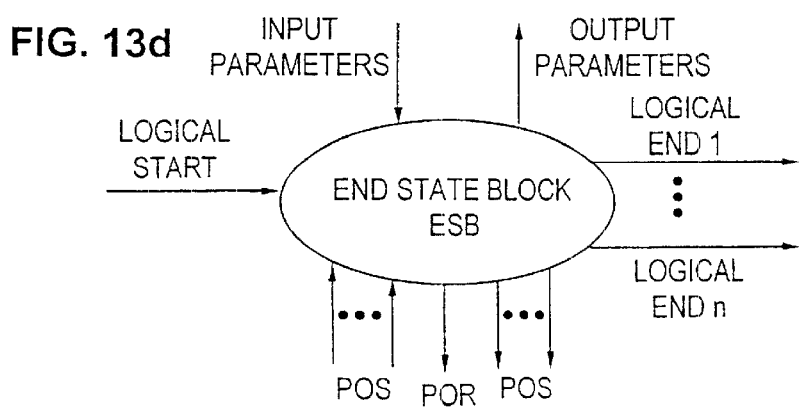
Figure 13E:
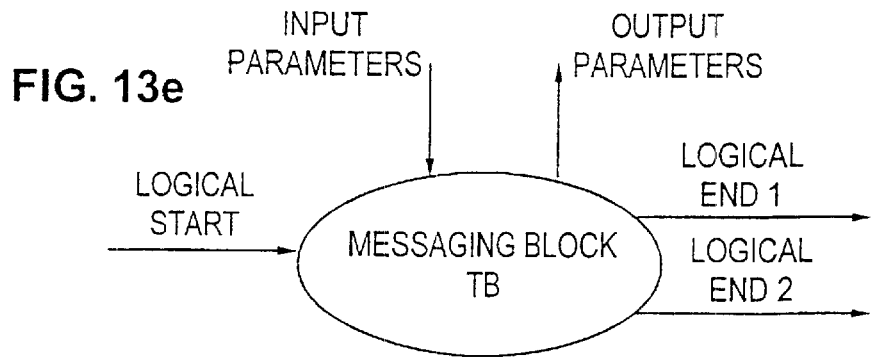
Figure 13F:
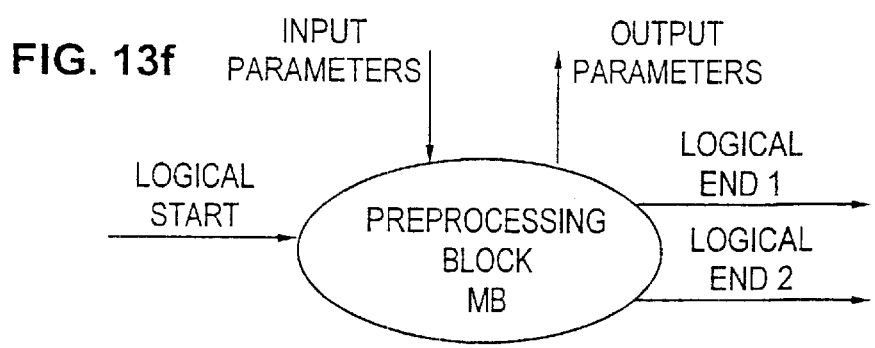
Figure 13G:
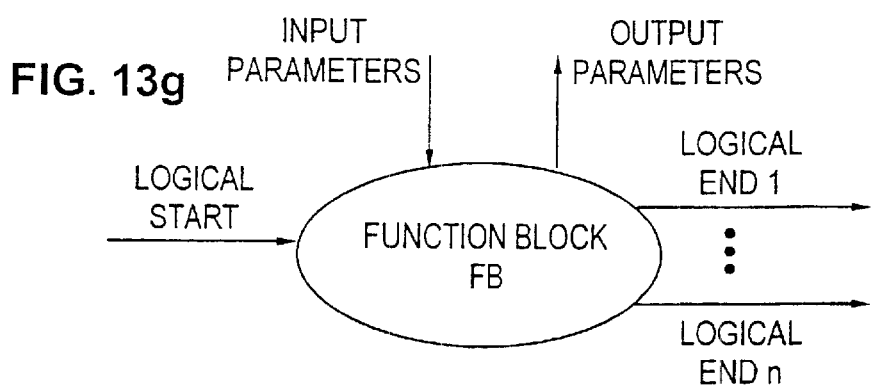
Figure 13H:
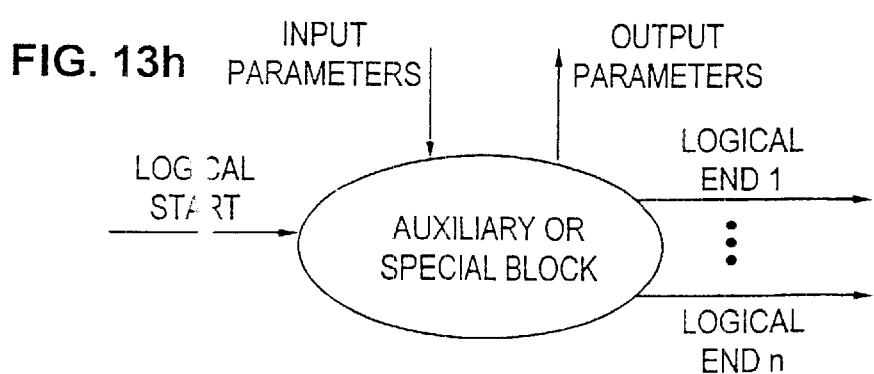

Each SIB further has one logical starting point and n logical end points. The logical input flow corresponding to the starting point is denoted with an arrow to the left of the block and the logical output flows corresponding to the end points with arrows to the right of the block. For the state blocks, the end points have been described above, with the exception that each block (also other blocks than state blocks) comprises, besides the above-described end points, one error end point representing an error that occurred within the block. For example the halt state block HSB (FIG. 13b) thus has end points corresponding to said internal error, a timeout message, a termination message, and each INAP message type. In the messaging blocks TB (FIG. 13e) and preprocessing blocks MB (FIG. 13f), the number n of logical end points is two (successful execution and unsuccessful execution which corresponds to the above error end point). However, the preprocessing block of an INAP error message arriving from the network makes an exception from the other preprocessing blocks in that it has a dedicated end point for each error type. The function blocks FB (FIG. 13g) and auxiliary and special blocks (FIG. 13h) generally have n end points.

Each SIB can also receive and send data from another service process. This interprocess communication (communication between SLP programs) is denoted with arrows below the block. The point at the reverse end of such an arrow may be either a point of initiation (POI), a point of synchronization (POS) or a point of return (POR). POI represents the logical start of SIB chains, POS represents synchronization and POR the logical termination of SIB chains. In services implemented in accordance with the invention, this communication has been implemented entirely in the state blocks. The initial state block ISB (FIG. 13a) is a POI as such, and there is no other interprocess communication from this block; only a POS arrow can go out from the halt state block HSB (FIG. 13b) and arrive therein, since the halt state comprises a delay state in which a response from outside is awaited, and this block has no other interprocess communication. Only a POS arrow can go out from the stop state block SSB (FIG. 13c) and arrive therein, since within said block the process can halt to await operations performed by FMP (there is only one arrow, however, since one acknowledgement message is sent from the block and one request message is received therein). From the end state block ESB (FIG. 13d) there is one outgoing POR arrow denoting the termination of the service. Furthermore, one or more POS arrows can go out from the end state block and arrive therein, since in the end state block release messages are sent to the network and a final response is awaited from the network.

In practice, new service programs can be developed in a known manner by using a high level tool in which service independent building blocks of the kind described above, which can be seen as icons, are combined graphically on the screen of a workstation.

In the above, a preferred embodiment of the invention has been described. However, it is possible to implement the service programs in such a manner that one does not use modules corresponding to feature keys or similar initial and stop state SIBs that constitute switches operating on the basis of the feature key, said switches switching the execution of the logic to the desired module. However, with the state SIBs described above, the objects of the invention can be achieved better than heretofore.

Even though the invention has been described in the above with reference to the examples in accordance with the accompanying drawings, it is obvious that the invention is not to be so restricted, but it can be modified within the scope of the inventive idea set forth above and in the appended claims. The implementation of services in accordance with the invention can for example be applied irrespective of whether subscriber-specific services are produced or whether the service logic is the same for a given group of subscribers or even all subscribers. All sending and reception functions need not necessarily be located in state blocks in accordance with the invention as described above, even though in that case some of the advantages of the invention are lost as some of the functions must be located in the conventional manner. The internal logic of a network element which is implemented within the halt state block can also vary in many ways. The actual logic is known per se, but the location of functional entities (with regard to the SIBs) differs from previous methods. Service programs can also be located in network elements of different types, for instance such that do not directly receive service requests.

What is claimed is:

1. A method for service provision in a telecommunications network, specifically in an intelligent network, in accordance with which method service programs (SLP) are stored in at least one network element of the network, service is provided by starting a service program executing the desired service logic, characterized in that the service programs of the network element are implemented by dividing functions into service independent building blocks (SIB) in such a way that a dedicated messaging block (TB) is formed for each individual message type to be sent from the service program to the network, and sending of messages of different types to the network is implemented by means of the messaging blocks, and after the messaging block a halt state block (HSB) comprising a halt state (DS) is used in the service logic to receive a message arriving from the network each time the type of the message sent by the messaging block is such that a response message of a given type is received to it in the case of faultless operation.

2. A method as claimed in claim 1 for providing services, characterized in that a least messaging internal to the network element is additionally implemented within the halt state block (HSB).

3. A method as claimed in claim 1 for providing services, characterized in that a dedicated messaging block is formed for all different message types.

4. A method as claimed in claim 1 for providing services, characterized in that a separate initial state block (ISB) is additionally used for receiving a service initiation message arriving from the network.

5. A method as claimed in claim 4 for providing services, characterized in that a separate end state block (ESB) is additionally used for sending message relating to the release of service which are independent of the service concerned.

6. A method as claimed in claim 5 for providing services, characterized in that the service program is implemented in such a way that it has at least two parallel modules (FM) executing different features, having a common initial state block (ISB) and a common end state block (ESB).

7. A method as claimed in claim 6 for providing services, characterized in that a separate stop state block (SSB) is implemented at the end of each parallel module for switching the execution of the logic to the start of the next parallel module or to the end state block.

8. A method as claimed in claim 7 for providing services, characterized in that the reception of all possible message types to be received from the network during the halt state is implemented within the halt state block (HSB).

9. A method as claimed in claim 7 for providing services, characterized in that all such states of the services in which a response is awaited from outside are implemented within the initial state, halt state, stop state and end state blocks.

10. A method as claimed in claim 7 for providing services, characterized in that in each service program one parallel module is such that it comprises in its start a halt state block (HSB), whereby the execution of the service can be temporarily transferred to wait in this block.

11. A method as claimed in claim 6 for providing services, characterized in that a special exception block is additionally used in the parallel modules to perform a jump to the start of the stop state block at the end of the parallel module within which said exception block is.

12. A method as claimed in claim 11 for providing services, characterized in that information on the feature to be executed next is also given in the exception block.

13. A method as claimed in claim 10 for providing services, characterized in that separate message preprocessing blocks (MB) are additionally used in the modules executing the features, for transferring the information that arrived in the received message to the use of the service program.

14. A method as claimed in claim 13 for providing services, characterized in that message preprocessing blocks are used after the halt state block to transfer the information received in at least some of the possible messages to the use of the service program.

15. A method as claimed in claim 11 for providing services, characterized in that said one module executing a feature is such that message preprocessing blocks are used after the halt state block for storing the information received in each possible message.

* * * * *